US 12,421,901 B2

(12) United States Patent
Miller et al.

(10) Patent No.: US 12,421,901 B2
(45) Date of Patent: Sep. 23, 2025

(54) CARBON RADIAL SEAL

(71) Applicant: RTX Corporation, Farmington, CT (US)

(72) Inventors: Jonathan L. Miller, Belchertown, MA (US); Jonathan F. Zimmitti, Glastonbury, CT (US); Christopher Charles Killian, Coatesville, PA (US); Bryan Richard Camerlin, Bozeman, MT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/435,985

(22) Filed: Feb. 7, 2024

(65) Prior Publication Data

US 2025/0109711 A1 Apr. 3, 2025

Related U.S. Application Data

(60) Provisional application No. 63/444,112, filed on Feb. 8, 2023.

(51) Int. Cl.
*F16J 15/34* (2006.01)
*F02C 7/28* (2006.01)

(52) U.S. Cl.
CPC ............... *F02C 7/28* (2013.01); *F16J 15/34* (2013.01)

(58) Field of Classification Search
CPC .................................... F02C 7/28; F16J 15/34
See application file for complete search history.

(56) References Cited

U.S. PATENT DOCUMENTS 2,085,457 A * 6/1937 Westerhouse .............. F16J 9/14
277/485
3,784,213 A 1/1974 Voitik
(Continued)

FOREIGN PATENT DOCUMENTS

EP 3263842 A1 1/2018

OTHER PUBLICATIONS

Brian P. Roche, "Bulkhead Seals—A Sealing Solution", Paper presented at the SNAME 11th Propeller and Shafting Symposium, Sep. 12, 2006, Paper No. SNAME-PSS-2006-14, Society of Naval Architects and Marine Engineers, Alexandria, Virginia, retrieved from Internet Oct. 25, 2023 https://steinseal.com/wp-content/uploads/2021/01/Bulkhead-Seals-A-Sealing-Solution.pdf.

*Primary Examiner* — Vishal A Patel
(74) *Attorney, Agent, or Firm* — Bachman & LaPointe, P.C.

(57) ABSTRACT

A machine has: an outer member; an inner member having an outer diameter (OD) surface; and a seal system. A seal housing is mounted to the outer member and has first and second walls; a first seal stage contacting the OD surface and the first wall; a second seal stage contacting the OD surface and the second wall; and a wave spring biasing the seal stages axially apart from each other. The seal stages each have a plurality of seal segments interfitting end to end and each having: a first end; a second end circumferentially opposite the first end; a first face; a second face axially opposite the first face; an inner diameter (ID) face; and an outer diameter (OD) face having a radially protruding lug. The housing has an inner diameter (ID) surface having recesses receiving the lugs of the seal stages to circumferentially retain the seal stages.

20 Claims, 11 Drawing Sheets

(56) References Cited

U.S. PATENT DOCUMENTS

| | | | |
|---|---|---|---|
| 4,417,734 A | 11/1983 | Sundberg | |
| 4,754,984 A * | 7/1988 | Keba | F16J 15/441 |
| | | | 277/503 |
| 5,058,904 A | 10/1991 | Nevola | |
| 6,679,678 B2 | 1/2004 | Giesler et al. | |
| 9,004,495 B2 * | 4/2015 | Vasagar | F16J 15/441 |
| | | | 277/579 |
| 9,194,424 B2 | 11/2015 | Garrison | |
| 9,890,650 B2 | 2/2018 | Von Berg et al. | |
| 9,970,549 B2 | 5/2018 | Miller | |
| 10,024,435 B2 | 7/2018 | Manry | |
| 11,287,043 B2 | 3/2022 | Manry | |
| 11,365,640 B2 | 6/2022 | Davis | |
| 2008/0053107 A1 * | 3/2008 | Weaver | F02C 7/28 |
| | | | 415/138 |
| 2015/0049968 A1 * | 2/2015 | Garrison | F16J 15/441 |
| | | | 384/115 |
| 2016/0010483 A1 * | 1/2016 | Miller | F04D 29/10 |
| | | | 277/580 |
| 2016/0258564 A1 * | 9/2016 | Fukumoto | F16J 15/3484 |
| 2017/0362949 A1 * | 12/2017 | Von Berg | F16J 15/24 |
| 2019/0264814 A1 * | 8/2019 | Manry | F16J 15/3212 |
| 2021/0190208 A1 | 6/2021 | Berard et al. | |
| 2022/0195889 A1 | 6/2022 | Lefebvre | |

\* cited by examiner

CARBON RADIAL SEAL

CROSS-REFERENCE TO RELATED APPLICATION

Benefit is claimed of U.S. Patent Application No. 63/444,112, filed Feb. 8, 2023, and entitled "Carbon Radial Seal", the disclosure of which is incorporated by reference herein in its entirety as if set forth at length.

BACKGROUND

The disclosure relates to gas turbine engines. More particularly, the disclosure relates to seals for isolating oil-containing bearing compartments.

Gas turbine engines (used in propulsion and power applications and broadly inclusive of turbojets, turboprops, turbofans, turboshafts, industrial gas turbines, and the like) include multiple main bearings (e.g., rolling element bearings-thrust and/or radial) supporting one spool relative to another or relative to grounded structure (e.g. a case).

The bearings are exposed to oil for lubrication and/or cooling. The oil may be passed as a recirculating flow that is passed to the bearings and then collected (scavenged) and ultimately returned to the bearings. To isolate the oil to bearing compartments, each associated with and containing one or more of the bearings, seal systems are used. Example seal systems are carbon seal systems.

To limit oil leakage past the seals, the seals may be buffered by delivering air (e.g., bleed air) to spaces opposite the compartments across the seals so that the compartments are at a lower pressure than the pressurized spaces.

In one group of two-spool engine configurations, a particularly relevant bearing compartment is located radially under the combustor, forward of the high pressure turbine (HPT). The high-pressure buffer air taken from the high pressure compressor (HPC) may pass through a cooler and have its pressure stepped down in one or more stages before entering the bearing compartment. A target delta pressure difference relative to the compartment may be maintained to limit any oil leakage. In various examples, a contacting carbon seal allows the required pressure drop.

Carbon seal systems are generally divided between face seals and shaft seals. In face seals, a generally radially-extending sealing face of the seal is in contact with a generally radially-extending seat surface of a member rotating relative to the seal. In a shaft seal, an inner diameter (ID) sealing surface of the seal is in sealing engagement/contact with outer diameter (OD) surface of a seat (which may include a surface of the shaft main body or a surface of a separate seat such as a cantilevered runner mounted by a proximal flange or the like).

A significant genus of shaft seals made by a variety of manufacturers have circumferentially segmented seals with each segment having first circumferential end features interfitting/mating with second circumferential end features of an identical adjacent segment. An example number of segments in such a circumferential array of segments forming a seal is three segments to twelve segments. The segments are biased circumferentially inward via a garter spring (e.g., tension coil spring) encircling the array and captured in an outer diameter (OD) groove of each segment. The segments are axially captured between adjacent surfaces of a seal housing mounting the seal. In a typical implementation, a circumferential array of coil springs bias the seal from a high pressure side surface of housing to a low pressure side surface of the housing.

For distribution of high pressure gas (e.g., the buffer air), the seals typically have open passageways along the respective low pressure face and ID face. These passageways typically include a circumferential groove (channel) in a relatively low pressure location: 1) in the seal low pressure face near the inner diameter of the contact between the seal low pressure face and adjacent housing low pressure face; and 2) in the ID face relatively closer to the bearing compartment. These circumferential grooves may be fed via axial grooves respectively extending from the OD for the low pressure face and extending from the high pressure face for the ID face. On such seals, intact material on the low pressure face between the low pressure face groove and the ID face forms a face dam and intact material of the ID face between the ID groove and low pressure face forms an ID dam. These dams form regions of pressure drop and are desirably minimized in span (subject to sufficiency against wear) to minimize the reduction in buffering. See FIG. 6 of Roche, Brian P., "Bulkhead Seals—A Sealing Solution", Feb. 11, 2008, Stein Seal Co., Kulpsville, Pennsylvania.

One example of such a configuration is shown in U.S. Pat. No. 5,058,904 (the '904 patent) of Nevola, entitled "Self-Contained Sealing Ring Assembly", and granted Oct. 22, 1991. Such circumferential grooves function to reduce contact forces to limit wear while countering oil leakage from the oil side (e.g., bearing compartment) to the air side (e.g., buffer chamber).

US Patent Application Publication No. 2021/0190208A1 (the '208 publication) of Berard et al., entitled "Self-Correcting Hydrodynamic Seal", and published on Jun. 24, 2021 discloses a variation wherein at one circumferential end of the seal segment, the circumferential groove in the low pressure face is open to that circumferential end. This feeds air to the inter-segment gap.

A two-stage seal is shown in U.S. Pat. No. 9,194,424B2 (the '424 patent) of Garrison, entitled "Circumferentially Back-to-Back Seal Assembly with Bifurcated Flow", and granted Nov. 24, 2015. A wave spring shown in U.S. Pat. No. 9,970,549B2 (the '549 patent) of Miller, entitled "Radial Coverage Piston Ring Groove Arrangement", and granted May 15, 2018.

SUMMARY

One aspect of the disclosure involves a machine comprising: an outer member; an inner member having an outer diameter (OD) surface; and a seal system. The seal system comprises: a seal housing mounted to the outer member and having a first wall and a second wall; a first seal stage contacting the inner member OD surface and the first wall; a second seal stage contacting the inner member OD surface and the second wall; and a wave spring biasing the first and second seal stages axially apart from each other. The first seal stage comprises a plurality of seal segments interfitting end to end and each having: a first end; a second end circumferentially opposite the first end; a first face; a second face axially opposite the first face; an inner diameter (ID) face; and an outer diameter (OD) face having a radially protruding lug. The second seal stage comprises a plurality of seal segments interfitting end to end and each having: a first end; a second end circumferentially opposite the first end; a first face; a second face axially opposite the first face; an inner diameter (ID) face; and an outer diameter (OD) face having a radially protruding lug. The housing further comprises an inner diameter (ID) surface having a plurality of recesses receiving the lugs of the first stage and the second stage to circumferentially retain the first stage and the second stage.

In a further embodiment of any of the foregoing embodiments, additionally and/or alternatively, the first stage and the second stage each comprise: a garter spring holding the seal segments together.

In a further embodiment of any of the foregoing embodiments, additionally and/or alternatively, for the segments of the first stage and the second stage the protruding lug is the only radially protruding lug.

In a further embodiment of any of the foregoing embodiments, additionally and/or alternatively, for the segments of the first stage and the second stage: the protruding lug is the only radially protruding lug has a height of 2.0 mm to 5.0 mm and a width of 10.0 mm to 20.0 mm and an axial span of 40% to 60%, an axial span of the segment.

In a further embodiment of any of the foregoing embodiments, additionally and/or alternatively, for the segments of the first stage and the second stage the outer diameter (OD) face has respective radial reliefs at a first circumferential end and a second circumferential end of the protruding lug.

In a further embodiment of any of the foregoing embodiments, additionally and/or alternatively, the segments of the first stage are identical to the segments of the second stage.

In a further embodiment of any of the foregoing embodiments, additionally and/or alternatively, for the segments of the first stage and the second stage: the radial reliefs are concavities.

In a further embodiment of any of the foregoing embodiments, additionally and/or alternatively: a first annular plate is between the wave spring and the first seal stage; and a second annular plate is between the wave spring and the second seal stage.

In a further embodiment of any of the foregoing embodiments, additionally and/or alternatively: a bearing in a bearing compartment supports the inner member for rotation relative to the outer member; and the seal system isolates the bearing compartment from a buffer chamber.

In a further embodiment of any of the foregoing embodiments, additionally and/or alternatively, the plurality of seal segments of the first stage and the second stage are a majority by weight carbon.

In a further embodiment of any of the foregoing embodiments, additionally and/or alternatively, the machine is a gas turbine engine wherein the inner member is a shaft and the outer member is static structure.

In a further embodiment of any of the foregoing embodiments, additionally and/or alternatively, the shaft is a high spool shaft.

In a further embodiment of any of the foregoing embodiments, additionally and/or alternatively, a method for using the machine comprises: driving rotation of the inner member relative to the outer member; and the recesses engaging the associated received lugs of the first stage and the second stage to circumferentially retain the first stage and the second stage relative to the outer member.

In a further embodiment of any of the foregoing embodiments, additionally and/or alternatively: the machine is a gas turbine engine and the inner member is a high speed shaft assembly; and the driving comprises running the engine.

A further aspect of the disclosure involves a seal segment comprising an arcuate body having: a first end; a second end circumferentially opposite the first end; a first face; a second face axially opposite the first face; an inner diameter (ID) face; and an outer diameter (OD) face. The seal segment is shaped to interfit with a plurality of identical seal segments first end to second end to form a seal surrounding a central longitudinal axis. The outer diameter (OD) face has a radially protruding lug having a first circumferential end and a second circumferential end. The outer diameter (OD) face has respective radial reliefs at the protruding lug first circumferential end and second circumferential end.

In a further embodiment of any of the foregoing embodiments, additionally and/or alternatively: the outer diameter (OD) face has a circumferential groove; the first face has a circumferential channel closer to the ID face than the OD face and a plurality of channels extending from the circumferential channel to the OD face; and the ID face has a circumferential channel closer to the first face than the second face and a plurality of channels extending from the circumferential channel to the second face.

In a further embodiment of any of the foregoing embodiments, additionally and/or alternatively, the radially protruding lug is between the outer diameter (OD) face circumferential groove and the second face.

In a further embodiment of any of the foregoing embodiments, additionally and/or alternatively, the radially protruding lug is the only radially-protruding lug on the segment.

In a further embodiment of any of the foregoing embodiments, additionally and/or alternatively, seal segment is a majority by weight carbon.

In a further embodiment of any of the foregoing embodiments, additionally and/or alternatively, the radial reliefs are concavities.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
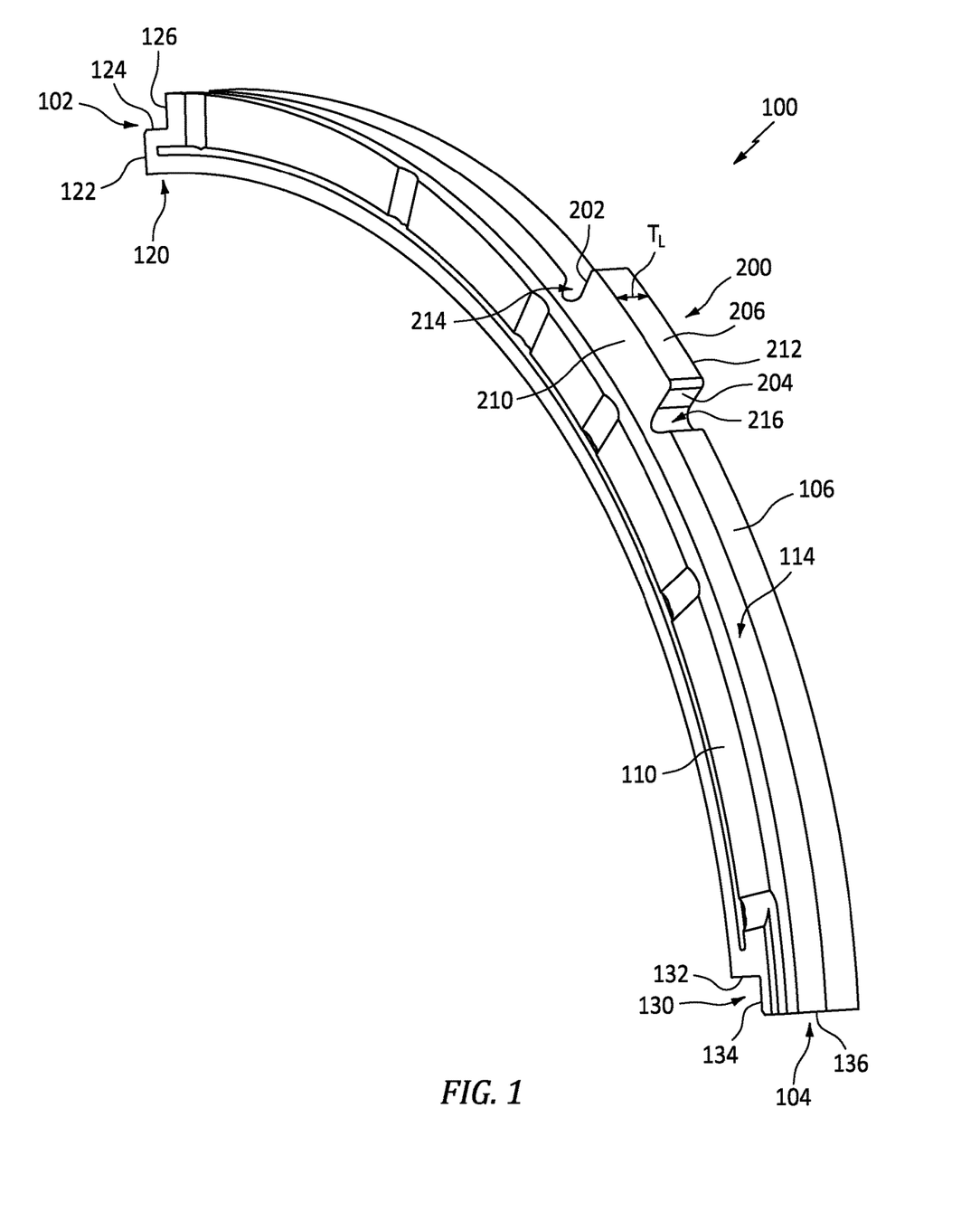
FIG. 1 a first view of a seal segment of a seal system.
Figure 2:
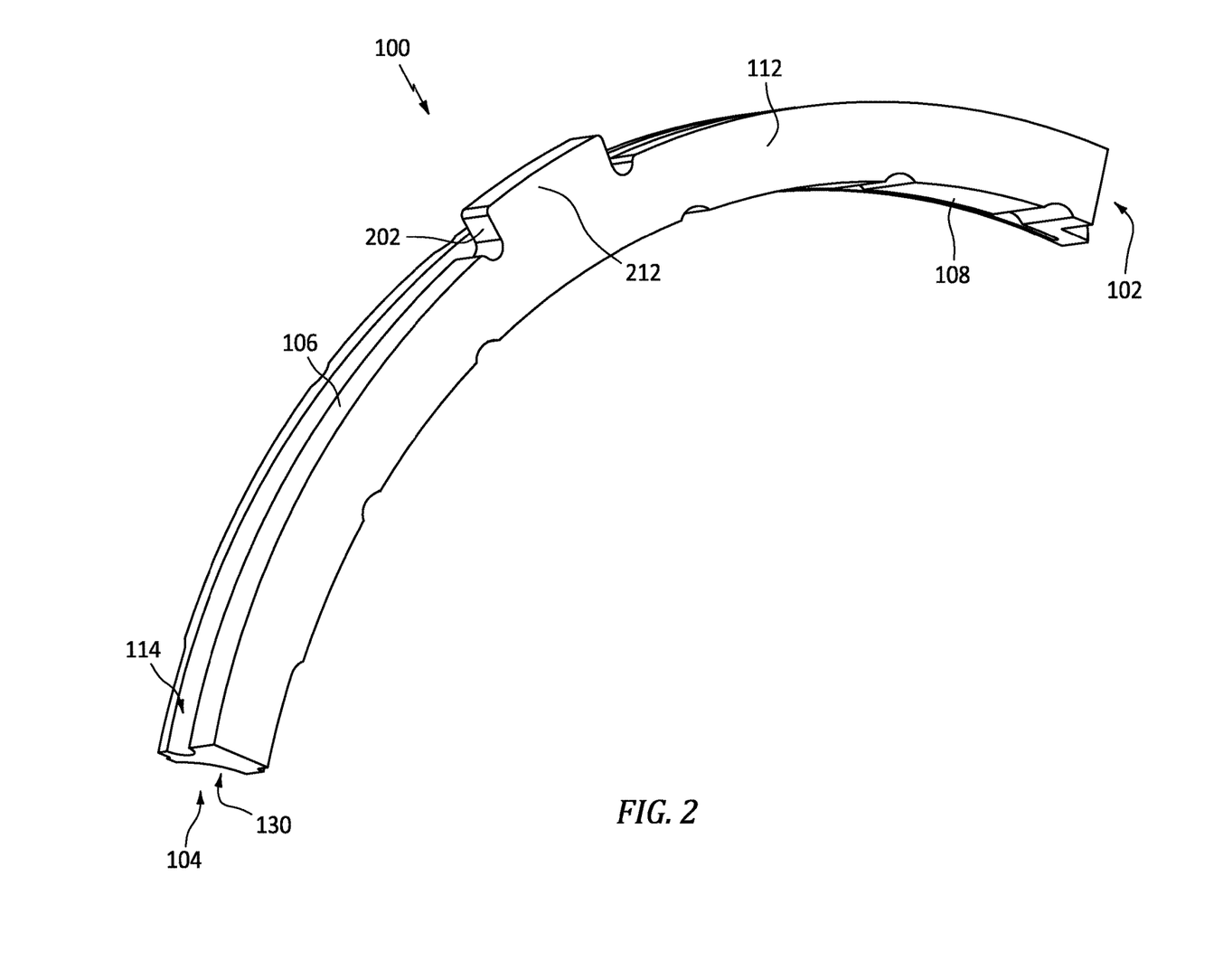
FIG. 2 is a second view of the seal segment.
Figure 5:
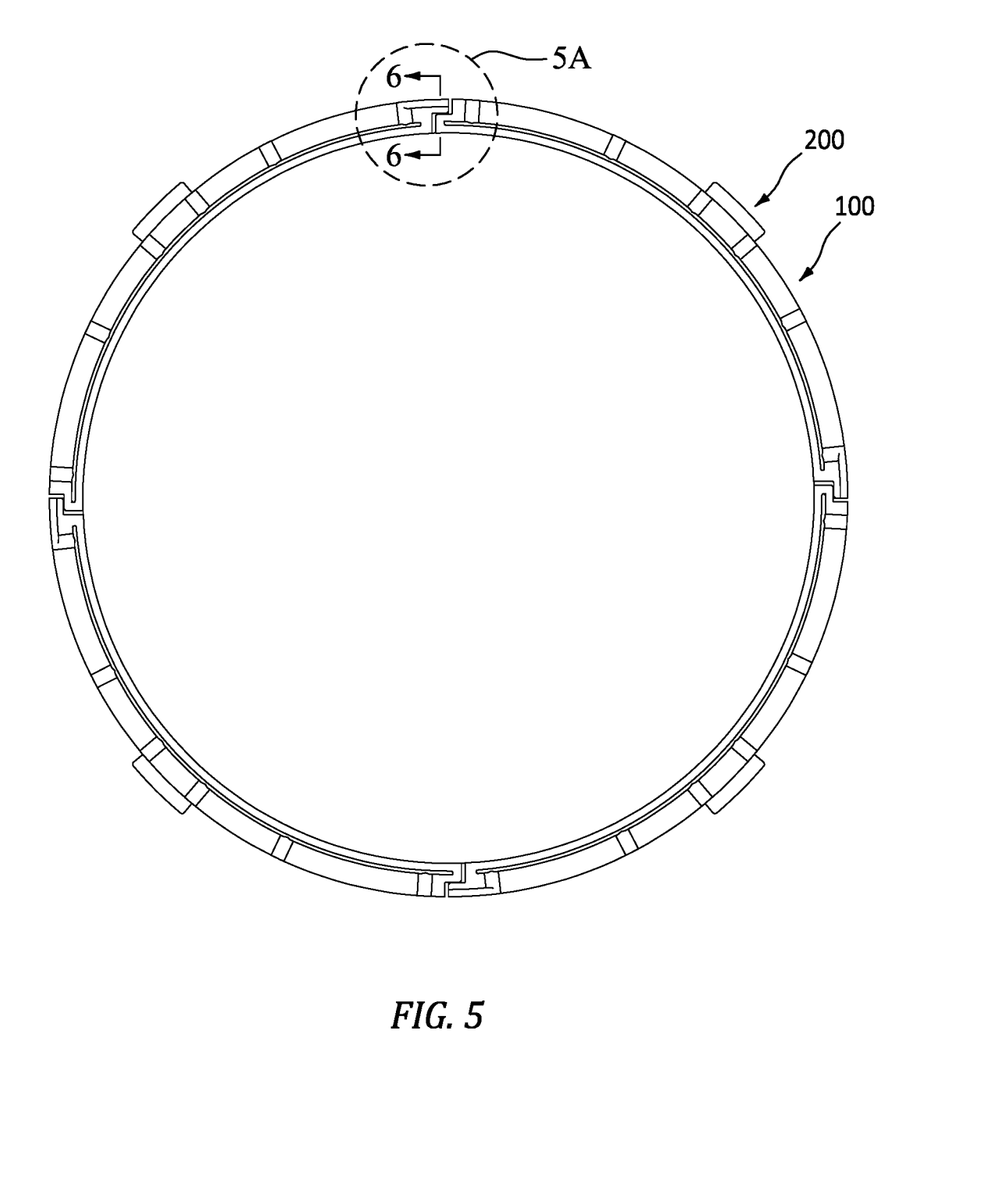
FIG. 5 is a first face view of a seal stage formed by an end-to-end array of the segments.
Figure 5A:
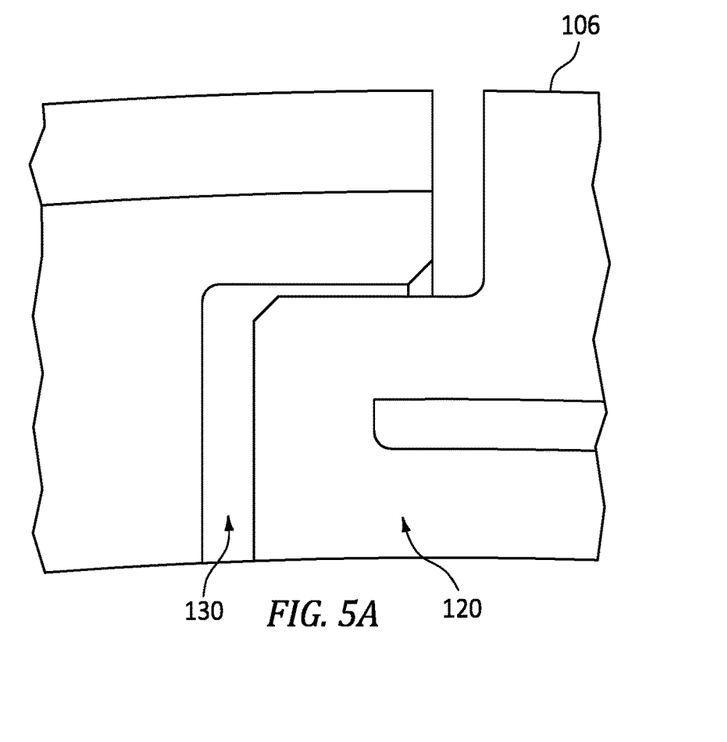
FIG. 5A is a cutaway view of a segment-to-segment junction in a seal formed by an array of the segments.

FIG. 1 shows a seal segment 100 formed as an arcuate carbon body extending from a first circumferential end (first end) 102 to a second circumferential end (second end) 104. The segment has an outer diameter (OD) face 106 and an inner diameter (ID) face 108 (FIG. 2). The segment has a first axial face 110 (axially facing, radially and circumferentially extending) (FIG. 1) and a second axial face 112 (FIG. 2). A seal stage (seal) (FIG. 5) is formed by a plurality of identical segments 100 in a circumferential array interfitting first end 102 to second end 104.

The seal may be used in a system in a turbomachine such as a gas turbine engine for a purpose such as isolating a bearing compartment (e.g., from a buffer chamber to which buffer air is directed).

To hold the segments in the array, the segments have an outer diameter (OD) groove 114 (FIG. 1) in the OD face 106 for receiving a circumferentially-extending garter spring (discussed below). The segment first end 102 comprises a protrusion 120 extending to an end face 122. An example protrusion 120 is adjacent an intersection of the first face 110 and ID face 108. The protrusion has a side face (surface) 124 facing generally radially outward and axially toward the second face 112 and extending circumferentially to a shoulder surface 126 which, in turn, merges with the OD face 106 and second face 112. An example surface 124 is arcuate when viewed in axial section.

Figure 6:
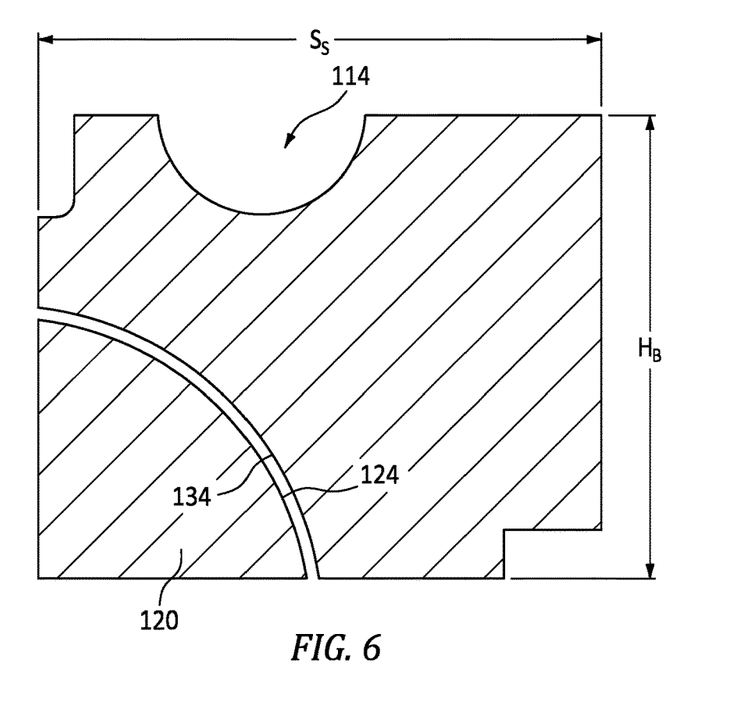
FIG. 6 is a central axial sectional view of the junction taken along line 6-6 of FIG. 5.

The second end 104 has a rebate 130 complementary to the first end 102 protrusion 120 so as to receive the protrusion 120 when the segments are interfitted end to end (FIG. 6). Thus, the rebate 130 has a base surface 132 (FIG. 1) and a lateral face 134 with the lateral face extending to an end face 136. In the end to end interfitting, the base surface 132, lateral face 134, and end face 136 respectively face the end face 102, side face 124, and shoulder surface 126 of the adjacent segment.

As discussed further below, the segment outer diameter face has a radially protruding lug 200 having a first circumferential end 202 and a second circumferential end 204 an outer diameter face 206 and first and second axial end faces 210 and 212, respectively. The segment outer diameter face has respective radial reliefs 214 and 216 at the first and a second circumferential ends of the protruding lug. The example reliefs are arcuate concavities. These provide stress relief while limiting lug height. The lug 200 has a thickness $T_L$, A radial span or height $H_L$, and a width $W_L$.

Figure 7:
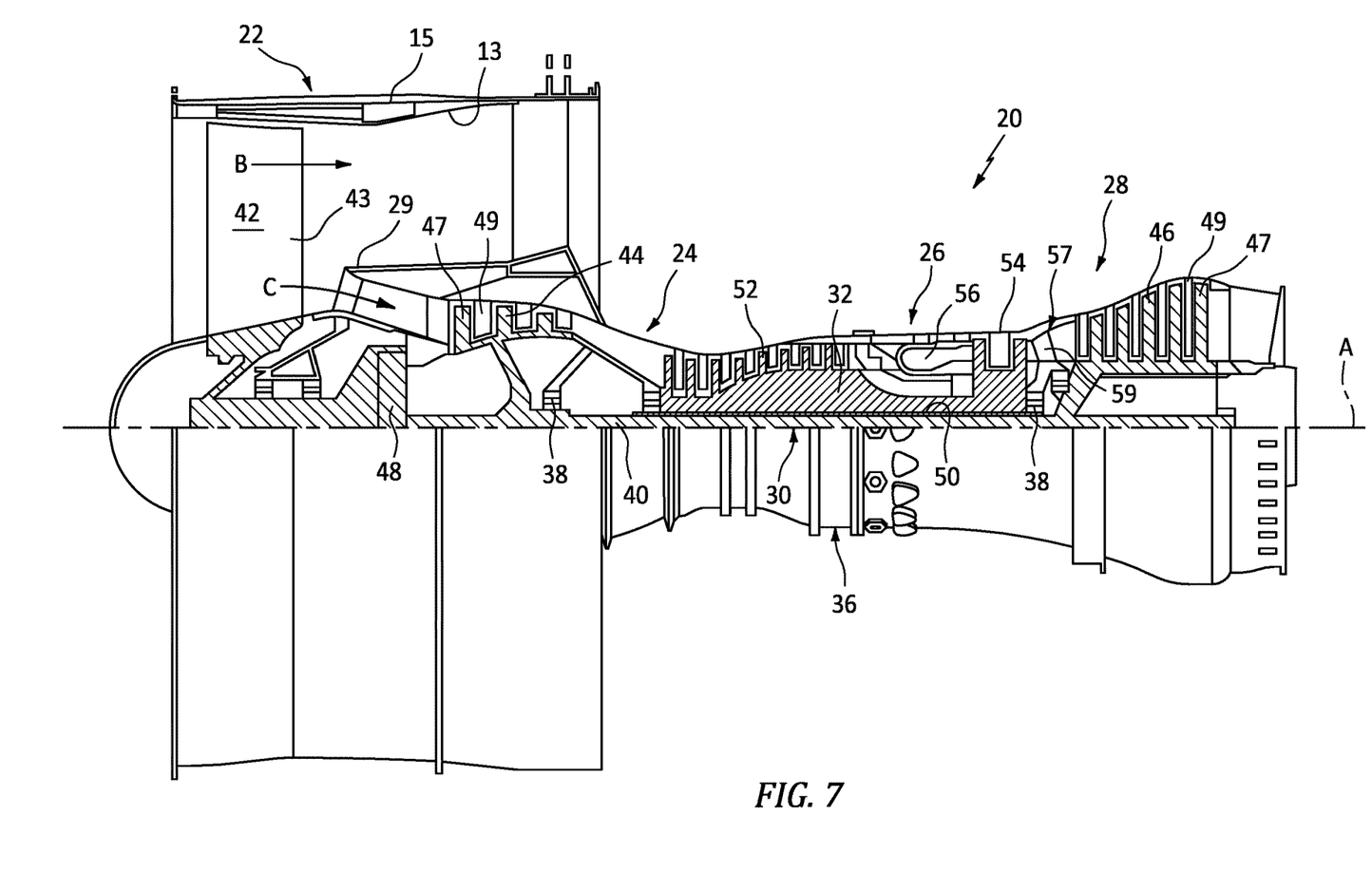
FIG. 7 is a schematic view of a gas turbine engine in which the seal system may be included.
Figure 7A:
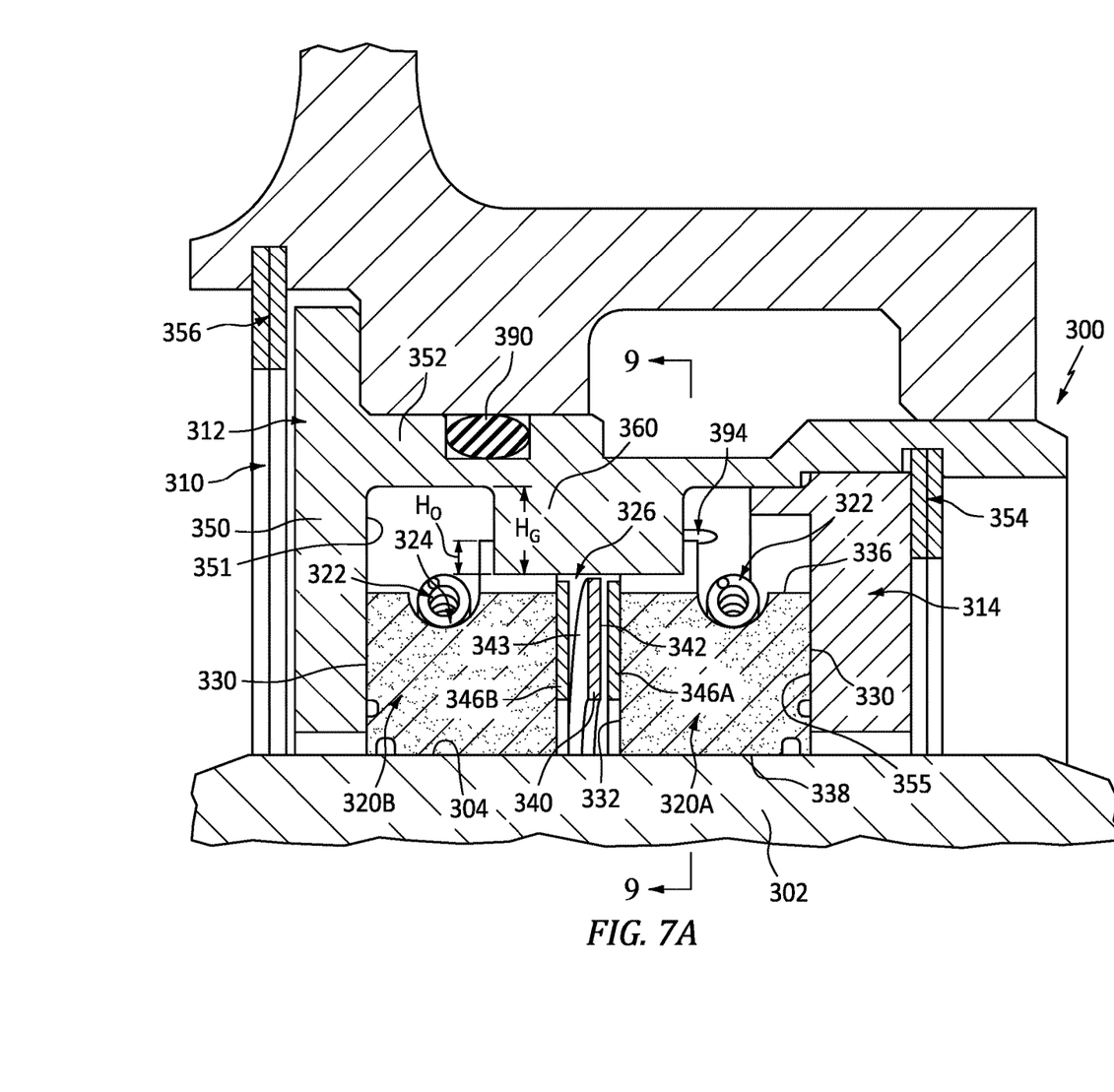
FIG. 7A is an enlarged central axial sectional view of a seal system.
Figure 8:
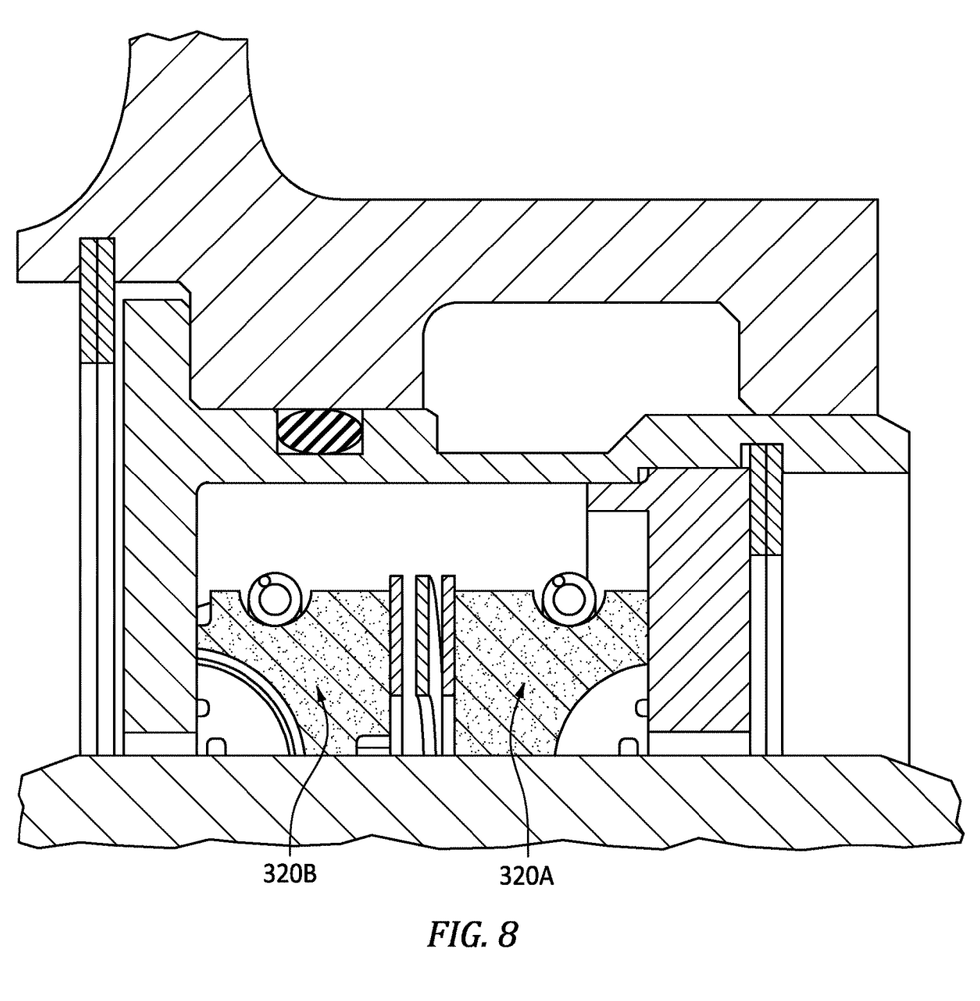
FIG. 8 is an enlarged central axial sectional view of the seal system circumferentially offset from the view of FIG. 7A.

FIG. 7A shows a sealing system 300 including a seal runner 302 mounted to or formed as a portion of a shaft assembly (e.g., a high shaft in a multi-spool engine—but useful elsewhere) and having an outer diameter runner surface 304. The sealing system has a housing assembly 310 mounted to or formed as a portion of static structure. The example housing assembly has a main housing piece 312 and a plug 314.

The sealing system has a first stage 320A and a second stage 320B. Each stage has a circumferential end-to-end array of the segments (FIG. 5) secured by an associated garter spring 322 (e.g., metallic tension coil spring) in an OD channel 324 formed by the segment OD channels 114. The stages have: axial end faces 330, 332 formed by the segment faces 110, 112; OD faces 336 formed by the segment OD faces 106; ID faces 338 formed by the segment ID faces 108. The stages are oppositely oriented with the segment faces 332 facing each other opposite a gap 326. The gap contains a wave spring 340 having respective first and second faces 342, 343 contacting respective annular plates 346A, 346B (e.g., large diameter/small radial span washers). Alternatively, it may lack the plates and the spring may bear directly against the faces 332.

The main housing piece 312 has an end flange or apertured radial web 350 with first and second end faces and OD and ID rims. The main housing piece 312 has a sidewall 352 extending from an intermediate location on the second face to an aft rim. The sidewall has OD and ID surfaces. Within the sidewall, the inboard face 351 of the web 350 contacts the adjacent seal stage face 330. The plug 314 is received within the sidewall 352 and has an external shoulder engaged to an internal shoulder of the sidewall. The plug is axially retained by a lock ring 354 engaging an outboard end surface of the plug. The opposite end surface 355 of the plug engages the adjacent seal stage face 330. The housing may be mounted to static structure and retained by a lock ring 356.

The housing sidewall 352 ID surface has a plurality of lugs 360, 362 (FIG. 9) cooperating with the seal segment lugs to circumferentially register/retain the associated segment. In the illustrated example, there are four pairs of housing lugs with a gap 364 (FIG. 10) between adjacent circumferential surfaces of the lugs of a given pair and accommodating the associated segment lug.

Example lug 200 thickness $T_L$ is 2.0 mm to 10.0 mm, more particularly 2.5 mm to 8.0 mm or 3.0 mm to 7.0 mm or 3.0 mm to 4.5 mm. Example radial span or height $H_L$ is 1.0 mm to 7.0 mm, more particularly 1.5 mm to 6.0 mm or 2.0 mm to 5.0 mm or 2.5 mm to 4.0 mm. Example width $W_L$ is 2.5 mm to 30.0 mm, more particularly 2.5 mm to 25.0 mm or 5.0 mm to 20.0 mm or 10.0 mm to 20.0 mm or 12.0 mm to 18.0 mm. FIG. 6 shows a seal segment overall axial span or length as $S_S$. Example $S_S$ is 8.0 mm to 10.0 mm, more broadly 5.0 mm to 20.0 mm or 6.0 mm to 15.0 mm.

Figure 3:
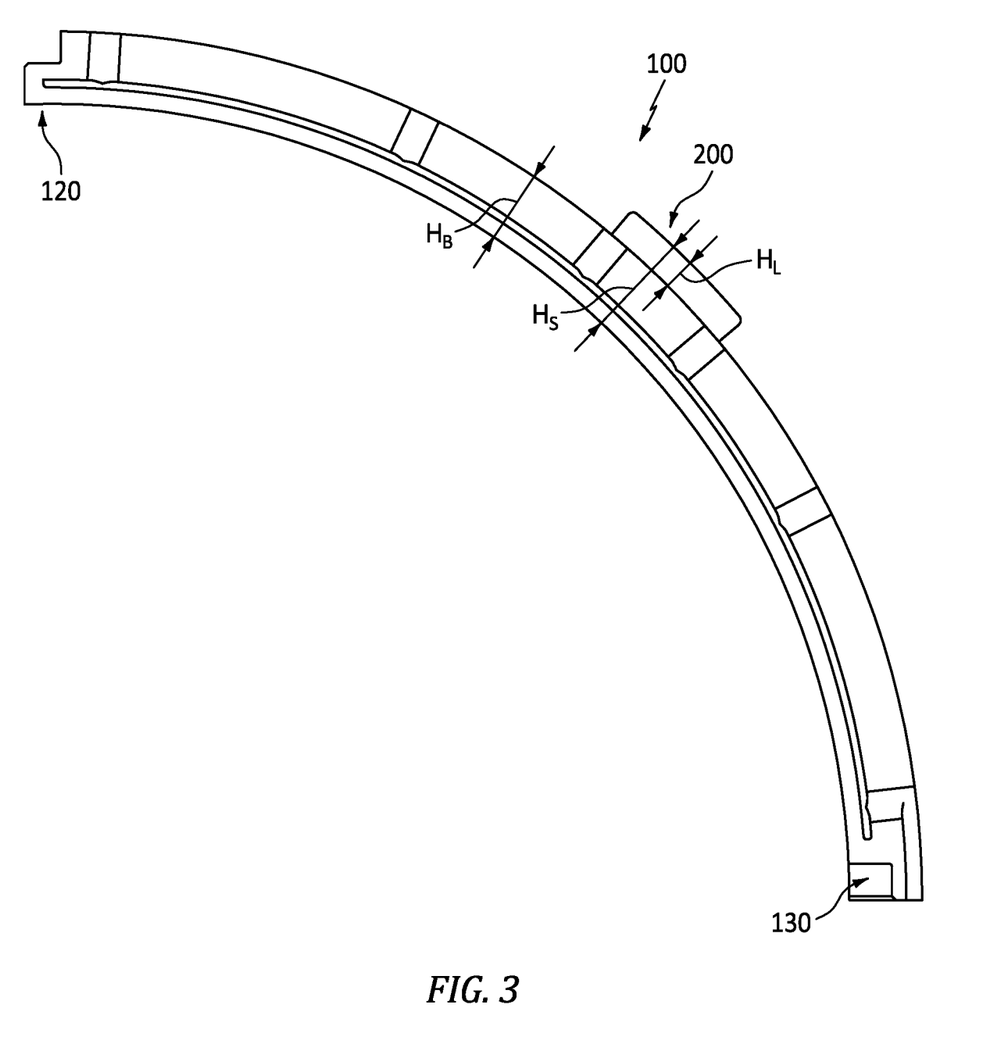
FIG. 3 is a first face view of the junction.
Figure 4:
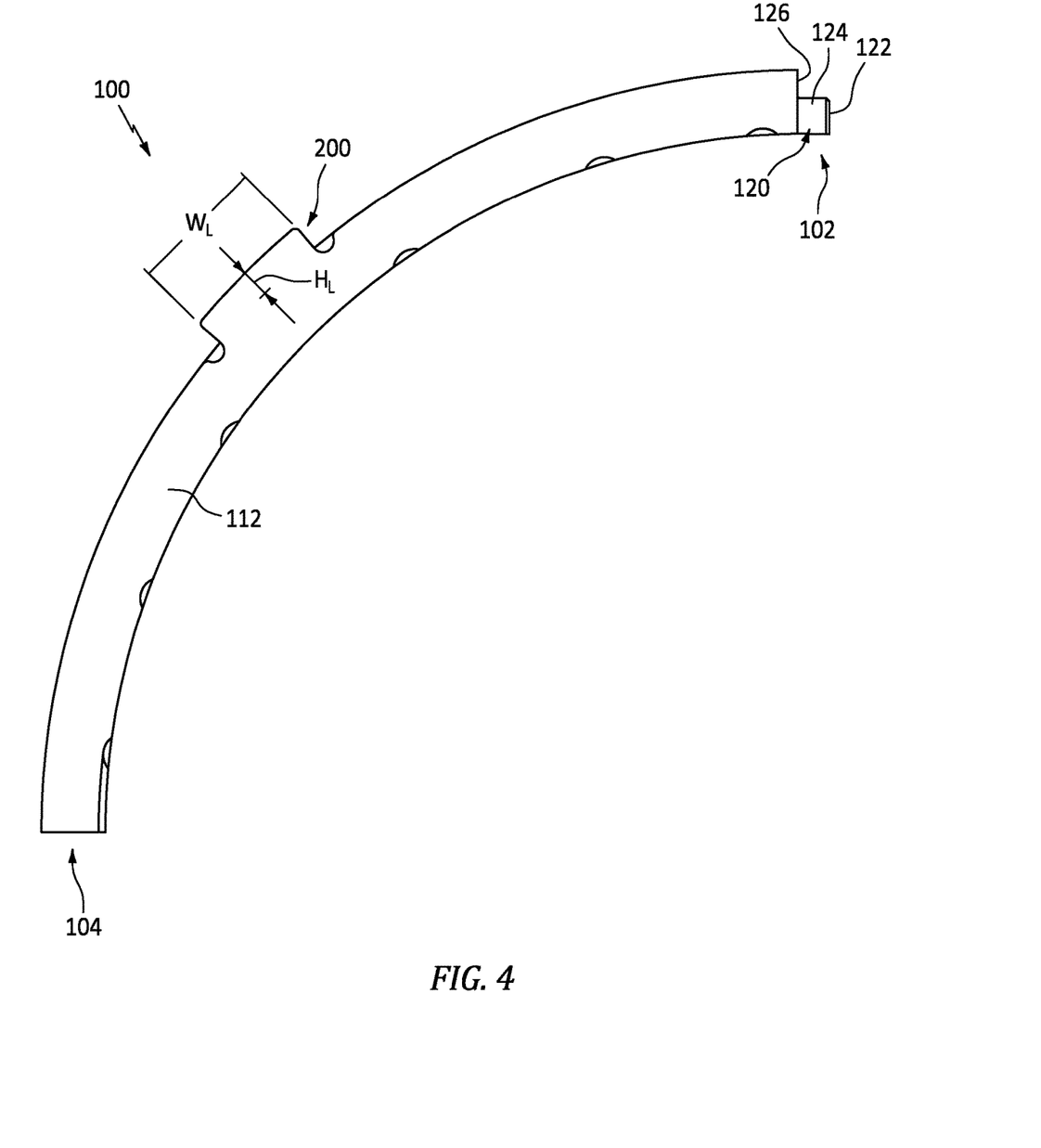
FIG. 4 is a second face view of the junction.

FIG. 3 shows a seal segment body radial span or height as $H_B$. This may be a span in a majority of the circumferential span away from the lug(s). An overall seal segment radial span is shown as $H_S$. Example $H_B$ is 6.0 mm to 8.0 mm, more broadly 4.0 mm to 16.0 mm or 5.0 mm to 12.0 mm. Example $H_B$ is less than $S_S$.

A radial span or height of the gap 364 and projections 360, 362 is shown as HG (FIG. 7A). Example HG is 3.0 mm to 5.0 mm, more broadly 1.0 mm to 8.0 mm or 2.0 mm to 6.0 mm or 2.5 mm to 5.0 mm. An example centered radial overlap of lug and groove (installed non-archbound condition) is shown as $H_O$. Example $H_O$ is 1.0 mm to 2.0 mm, more broadly 1.0 mm to 4.0 mm or 1.2 mm to 3.0 mm.

Figure 9:
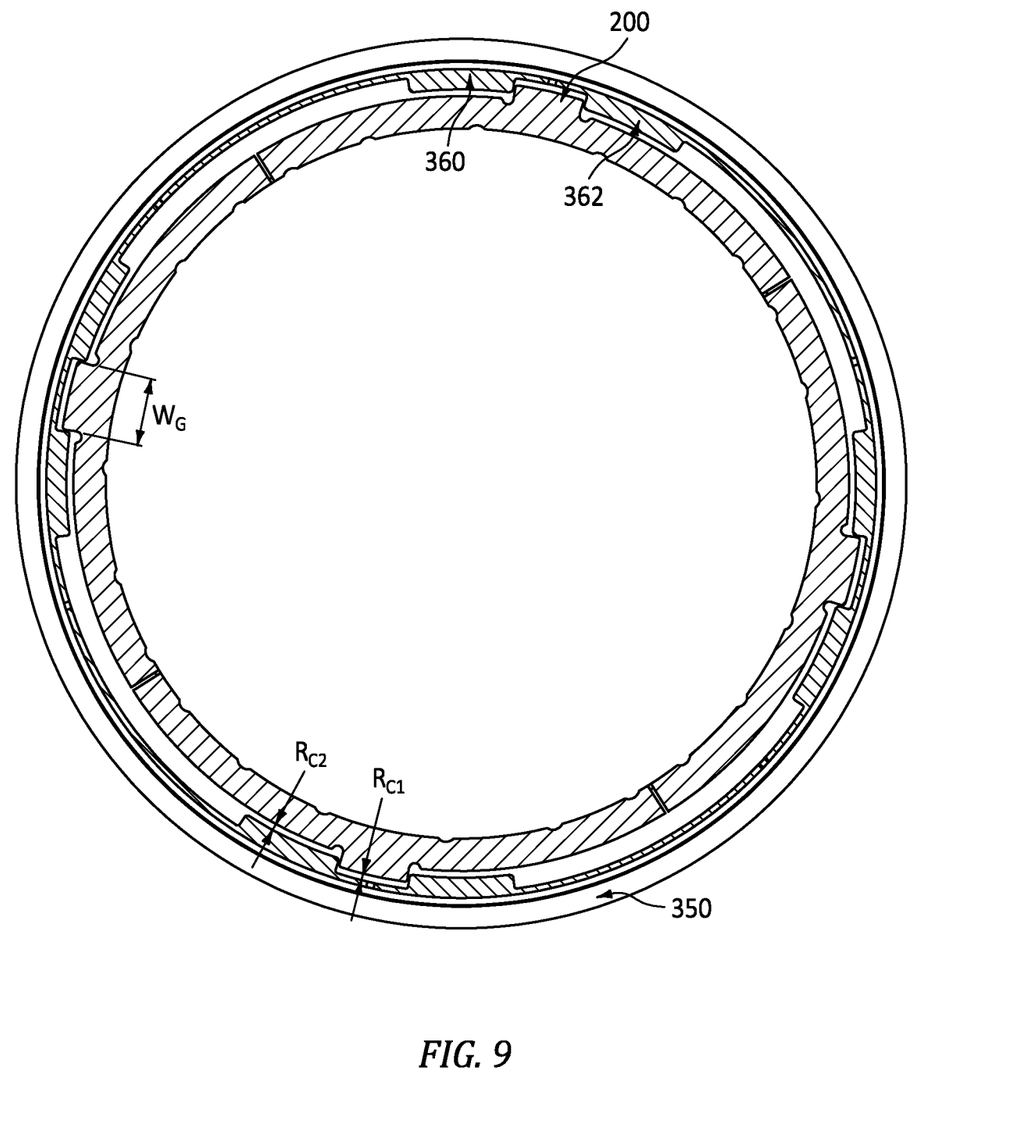
FIG. 9 is a transverse sectional view of the seal system.
Figure 10:
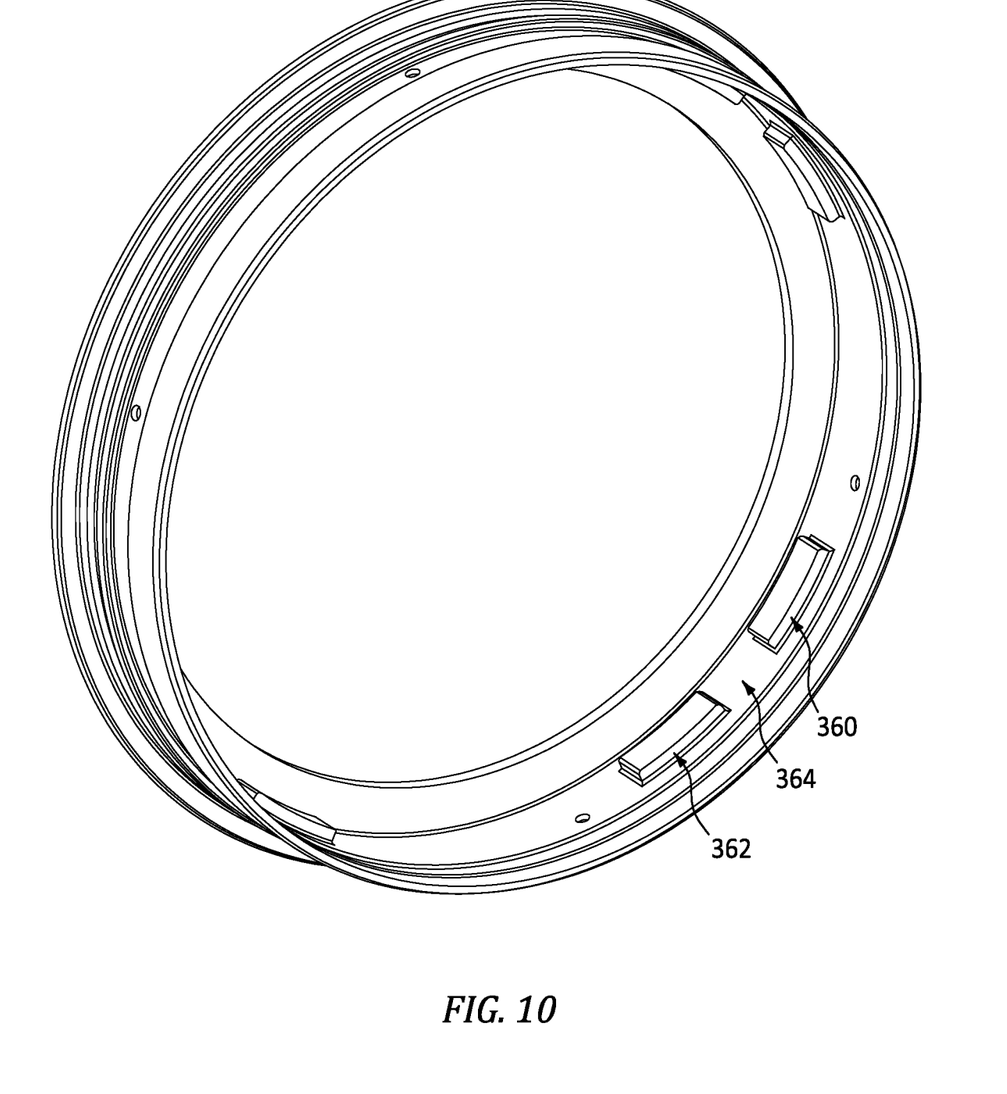
FIG. 10 is a view of a housing of the seal system.

A gap width $W_G$ is shown in FIG. 9. Example gap width is 16.0 mm to 20.0 mm, more broadly 3.0 mm to 30 mm or 12 mm to 24 mm. Example gap width is 0.5 mm to 0.8 mm greater than $W_L$, more broadly 0.1 mm to 5.0 mm or 1.0 mm to 4.0 mm, or 3.0% to 6.0% greater than $W_L$, more broadly 1.0% to 20.0% or 2.0% to 10.0%. This leaves a small circumferential gap at the lugs (which may exist at only one circumferential end of the lug or may be split with gaps/portions at both ends.

A radial gap or clearance $R_{C1}$ at the lugs a is shown in FIG. 9. A radial gap or clearance $R_{C2}$ at the projections 360, 362 is shown in FIG. 9. The lesser or both of these clearances may be an example 1.5 mm with the seal on the runner in a non-archbound condition, more broadly, 1.0 mm to 5.0 mm. When off the runner pre-installation, in an archbound condition (end-to-end contact of all segments), clearances may be an example 1.5 mm or greater, more particularly, at least 2.0 mm or 2.0 mm to 10 mm.

Example $T_L$ is 25% to 65% of the overall segment axial span ($S_S$ (FIG. 6)), more particularly 40% to 60%. An example ratio $W_L/W_G$ is from 0.75 to 0.95. Example, $H_L$/HG is 0.95 to 1.00. In an example, the segment dimensions are such that when archbound, there is still radial overlap $H_O$. This maintains rotational orientation of the assembled segments relative to the housing.

FIG. 7A also shows an o-ring seal 390 in an OD groove in the sidewall 352 sealing against the static structure. It also shows a circumferential array of vent apertures 394 that function to supply high pressure buffer air to the cavity in-between the first and second stages. This higher pressure buffer air provides additional axial force to seat the ring stages against the respective sealing faces of the main housing piece 312 web 150 and the plug 314 and maintain more favorable/optimal sealing characteristic and axial seating.

In a further variation, each seal segment may have more than one lug and there may be complementary lugs on the housing. For example, advantages of doing this could include reduced anti-rotation wear of the lug surfaces. When there are more lugs the total surface area can be increased and the corresponding contact pressure will be reduced. Also, lugs may be placed at the circumferential ends of the segment instead of the middle portion. Having the lug(s) near one or both of the ends 102 or 104 may provide reduced deformation/deflections of the segment at that end location and could reduce the amount of clearance or displacement of that respective segment end. In one example, the only lugs are a first lug near the first circumferential end and a second lug at the second circumferential end. Displacements of the segment end directly influence the final clearances between segment and housing, and between segment ends. Having these joint clearances smaller would help reduce overall air leakage.

FIG. 7 schematically illustrates a gas turbine engine 20 as one of many examples of an engine in which a seal system including the segments 100 may be used. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the example gas turbine engine 20 is illustrated as a geared architecture 48 to drive the fan 42 at a lower speed than the low speed spool 30. The inner shaft 40 may interconnect the low pressure compressor (LPC) 44 and low pressure turbine (LPT) 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor (HPC) 52 and a second (or high) pressure turbine (HPT) 54. A combustor 56 is arranged in the example gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

Component materials and manufacture techniques and assembly techniques may be otherwise conventional. Example seal segment materials include a variety of base carbon materials (e.g., carbon graphite and electrographite) optionally with various impregnants (e.g., for strength/cohesion and/or lubricity) suitable for particular operating environments and conditions. Example material is at least 50% carbon by weight, more particularly, at least 90% or 95% or 99% or even commercially pure carbon with inevitable impurities. Example segments may be molded and/or machined. For example, there are numerous commercially available annular carbon seal blanks. Such a stock blank may be lathed to profile and may then have material milled and drilled away to reveal the non-annular features such as the grooves, spring compartments, and interfitting end features. For segmenting, fewer segments may be cut at a given axial location to allow for the interfitting end features. For example, three segments for a four-segment seal may be cut from a blank or an axial portion of a blank. Lug profiling may be via side mill or end mill. The concave reliefs may be machined such as by side mill (oriented axially and traversed radially inward) or rounded (e.g., hemispherical) tipped end mill (oriented radially or near radially and traversed axially).

Example runner materials are alloys (e.g., steel such as stainless steel, titanium alloys, and nickel-based superalloys) and alternatively ceramics. Example housings can be metallic (e.g., titanium- or nickel-based alloys, as well as, steel). Machining may be conventional such as lathing outer features and gross inner features and then milling down to leave the projections 360, 362 and gaps.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. For example, venting and pressure balancing channels may be preserved from a baseline, as may be materials and manufacture techniques. Accordingly, other embodiments are within the scope of the following claims.

What is claimed is:

1. A machine comprising:
    an outer member;
    an inner member having an outer diameter (OD) surface; and
    a seal system comprising:
        a seal housing mounted to the outer member and having a first wall and a second wall;
        a first seal stage contacting the inner member outer diameter (OD) surface and the first wall;
        a second seal stage contacting the inner member outer diameter (OD) surface and the second wall; and
        a wave spring biasing the first and second seal stages axially apart from each other, wherein:
    the first seal stage comprises a plurality of seal segments interfitting end to end and each segment having:
        a first end;
        a second end circumferentially opposite the first end;
        a first face;
        a second face axially opposite the first face;
        an inner diameter (ID) face; and
        an outer diameter (OD) face having a circumferential groove and a single radially protruding lug;
    the second seal stage comprises a plurality of seal segments interfitting end to end and each segment having:
        a first end;
        a second end circumferentially opposite the first end;
        a first face;
        a second face axially opposite the first face;
        an inner diameter (ID) face; and
        an outer diameter (OD) face having a circumferential groove and a single radially protruding lug, the radially protruding lug between the circumferential groove and the second face;
    for the segments of the first stage and the second stage the outer diameter (OD) face has respective radial reliefs at a first circumferential end and a second circumferential end of the protruding lug;
    the first stage and the second stage each comprise a garter spring holding the seal segments together; and
    the housing further comprises:
        an inner diameter (ID) surface having a plurality of recesses receiving the lugs of the first stage and the second stage to circumferentially retain the first stage and the second stage.

2. The machine of claim 1 wherein for the segments of the first stage and the second stage:
    the protruding lug has a height of 2.5 mm to 5.0 mm and a width of 15.0 mm to 18.0 mm and an axial span of 40% to 60%, an axial span of the segment.

3. The machine of claim 1 wherein for the segments of the first stage and the second stage:
    the protruding lug axial span is 3.0 mm to 4.5 mm.

4. The machine of claim 1 wherein for the segments of the first stage and the second stage:
    the protruding lug has a height of 2.0 mm to 5.0 mm and a width of 10.0 mm to 20.0 mm and an axial span of 40% to 60%, an axial span of the segment.

5. The machine of claim 1 wherein the segments of the first stage and the second stage are in a non-archbound condition.

6. The machine of claim 1 wherein:
    the segments of the first stage are identical to the segments of the second stage.

7. The machine of claim 1 wherein for the segments of the first stage and the second stage:
    the radial reliefs are concavities.

8. The machine of claim 1 further comprising:
    a first annular plate between the wave spring and the first seal stage; and
    a second annular plate between the wave spring and the second seal stage.

9. The machine of claim 1 further comprising:
    a bearing in a bearing compartment and supporting the inner member for rotation relative to the outer member; and
    a buffer chamber, the seal system isolating the bearing compartment from the buffer chamber.

10. The machine of claim 1 wherein:
    the plurality of seal segments of the first stage and the second stage are a majority by weight carbon.

11. The machine of claim 1 being a gas turbine engine wherein:
    the inner member is a shaft and the outer member is static structure.

12. The machine of claim 11 wherein:
    the shaft is a high spool shaft.

13. The machine of claim 1 wherein for the segments of the first stage and the second stage:
    the outer diameter (OD) face has a circumferential groove;
    the first face has:
        a circumferential channel closer to the ID face than the OD face; and
        a plurality of channels extending from the circumferential channel to the OD face; and
    the ID face has:
        a circumferential channel closer to the first face than the second face; and
        a plurality of channels extending from the circumferential channel to the second face.

14. The machine of claim 13 wherein:
    the radially protruding lug is between the outer diameter (OD) face circumferential groove and the second face.

15. The machine of claim 13 wherein for the segments of the first stage and the second stage:
    the segments of the first stage are identical to the segments of the second stage.

16. The machine of claim 15 wherein for the segments of the first stage and the second stage:
    the seal segment is a majority by weight carbon.

17. The machine of claim 13 wherein for the segments of the first stage and the second stage:
    the seal segment is a majority by weight carbon.

18. A method for using the machine of claim 1, the method comprising:
   driving rotation of the inner member relative to the outer member; and
   the recesses engaging the associated received lugs of the first stage and the second stage to circumferentially retain the first stage and the second stage relative to the outer member.

19. The method of claim 18 wherein:
   the machine is a gas turbine engine and the inner member is a high speed shaft assembly; and
   the driving comprises running the engine.

20. The method of claim 18 wherein:
   the plurality of seal segments of the first stage and the second stage are a majority by weight carbon.

* * * * *